S. W. ROWELL.
Strainers.

No. 151,438.

Patented May 26, 1874.

WITNESSES
Mary J. Utley
George E. Upham

INVENTOR
Sidney W. Rowell
Chipman Hosmer & Co
By

ATTORNEYS.

UNITED STATES PATENT OFFICE.

SIDNEY W. ROWELL, OF RUTLAND, VERMONT.

IMPROVEMENT IN STRAINERS.

Specification forming part of Letters Patent No. 151,438, dated May 26, 1874; application filed January 24, 1874.

*To all whom it may concern:*

Be it known that I, SIDNEY W. ROWELL, of Rutland, in the county of Rutland and State of Vermont, have invented a new and valuable Improvement in Strainers; and I do hereby declare that the following is a full, clear, and exact description of the construction and operation of the same, reference being had to the annexed drawings making a part of this specification, and to the letters and figures of reference marked thereon.

Figure 1:
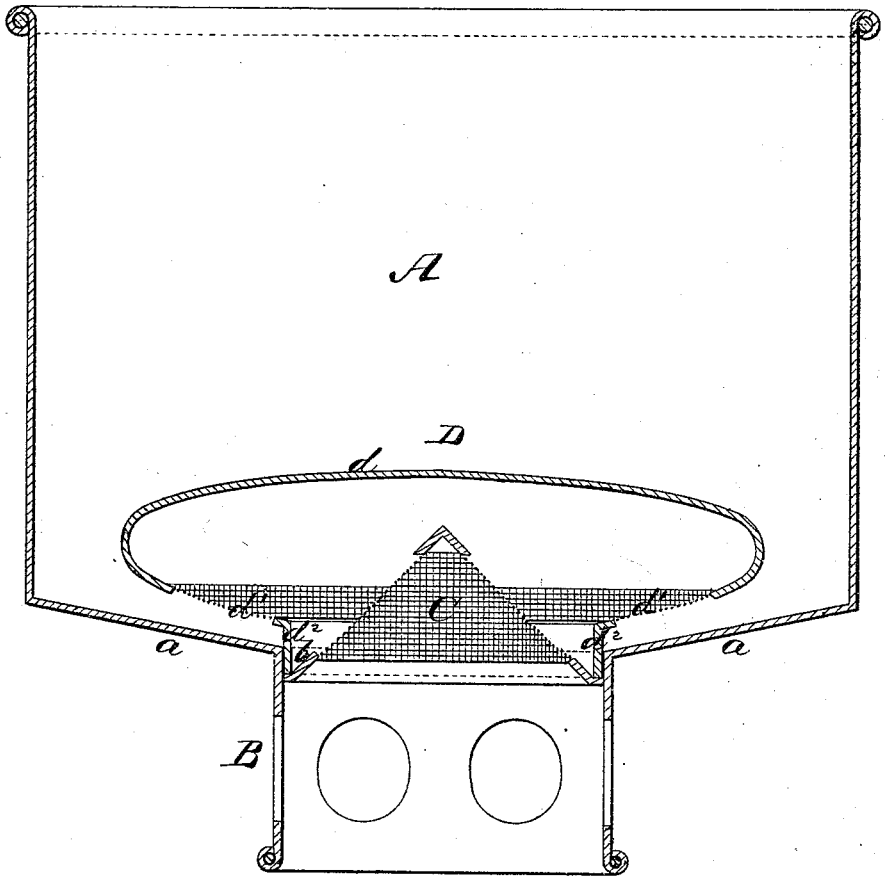
Figure 2:
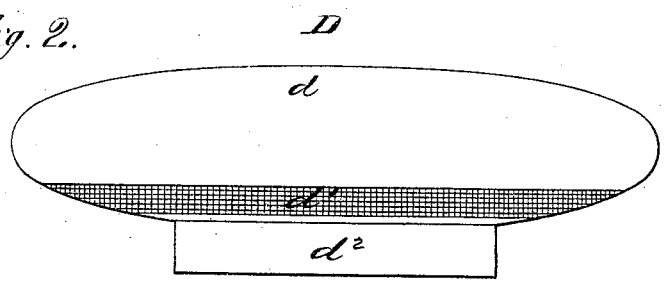

Figure 1 of the drawing is a representation of a sectional view of my strainer. Fig. 2 is a detail view of the same.

This invention has relation to strainers for all kinds of fluids; and it consists essentially in the arrangement, inside of a suitable receiver, of a cap or shield made hollow and with an outlet-neck, and having fine wire gauze or other suitable strainer material applied to its bottom, whereby the fluid being strained is compelled to flow upwardly through said gauze, thus allowing the sediment to settle on the bottom of the receiver, below the gauze, and out of the way of the currents, as will be hereinafter explained. The invention also consists in combining with a strainer of the kind above named an auxiliary conical strainer, which also rises above the bottom of the receiver, as will be hereinafter explained.

The following is a description of my improvements:

In the annexed drawings, A represents a receiver, which may be of any suitable shape and capacity, and which has an inverted conical bottom, $a$, terminating centrally in a tubular outlet, B. C designates a cone, which is made wholly or in part of gauze or some other suitable strainer material, having a narrow imperforated band, $b$, around its base. This conical strainer C is secured by its base, inside of the tubular outlet B, a little below the upper end thereof, and the apex of this strainer rises above the bottom of the receiver, and is received inside of the neck of a removable strainer, D. The strainer D is constructed with an imperforated convex or flat top, $d$, and an annular perforated straining bottom, $d^1$, and a neck, $d^2$, which latter fits into the upper end of the tubular outlet B.

It will be seen from the above description, taken in connection with the annexed drawings, that the top of the strainer $d$ receives upon it the fluid while being poured into the receiver, and thus breaks the force of the stream and prevents the sediment from being dashed through the strainer. The fluid, after striking the top $d$, flows to the bottom of the receiver, and passes upwardly through the gauze $d^1$, and thence passes through the neck $d^2$, through the conical strainer C, and finally out through the tube B. By means of the strainer $d^1$, which is above the bottom of the receiver A, all the sediment which is left behind settles down out of the currents passing through said strainer $d$, and, consequently, does not clog its meshes. The second or conical strainer C is intended for re-straining the fluid, and by reason of its conical sides the sediment will settle into the annular chamber at the base of this cone, and may be cleaned out by removing the first strainer. If desired, another strainer may be employed at the lower end of the tubular outlet B by attaching a gauze thereto in any suitable manner.

What I claim as new, and desire to secure by Letters Patent, is—

1. The combination, with a funnel-shaped reservoir, A, having a tubular extension, B, of an upwardly-conical strainer-diaphragm, C, connected to said extension by an upwardly-inclined base-flange, $b$, to form a sediment-channel, substantially as specified.

2. The combination, with a funnel-reservoir having the conical straining-diaphragm C and the base-flange $b$, of the annular reverse strainer $d^1$, fitting over the conical strainer, and provided with a guard-cap, $d$, and a neck, $d^2$, adjustable within the tube B to rest on the flange $b$, substantially as specified.

3. The upwardly and outwardly flaring strainer $d^1$, having its outer edge connected to the dome-guard $d$, and its inner edge connected to the neck $d^2$, as specified.

In testimony that I claim the above I have hereunto subscribed my name in the presence of two witnesses.

SIDNEY W. ROWELL.

Witnesses:
N. KELLOGG,
HENRY F. FIELD.